(12) United States Patent
Islam et al.

(10) Patent No.: US 9,242,737 B2
(45) Date of Patent: Jan. 26, 2016

(54) AIRBAG MODULE ON PASSENGER DOOR

(71) Applicants: Rakibul Islam, Mission Viejo, CA (US); Adrianus W. N. Ruiter, Corona Del Mar, CA (US); Maurice Pinault, Paris (FR); Jean-Marc Obadia, Maubec (FR)

(72) Inventors: Rakibul Islam, Mission Viejo, CA (US); Adrianus W. N. Ruiter, Corona Del Mar, CA (US); Maurice Pinault, Paris (FR); Jean-Marc Obadia, Maubec (FR)

(73) Assignee: Zodiac Seats France, Issoudun (FR)

( * ) Notice: Subject to any disclaimer, the term of this patent is extended or adjusted under 35 U.S.C. 154(b) by 530 days.

(21) Appl. No.: 13/626,912

(22) Filed: Sep. 26, 2012

(65) Prior Publication Data

US 2013/0075524 A1 Mar. 28, 2013

Related U.S. Application Data

(60) Provisional application No. 61/538,988, filed on Sep. 26, 2011.

(51) Int. Cl.
 *B64C 1/14* (2006.01)
 *B64D 25/14* (2006.01)
 *B64D 25/00* (2006.01)

(52) U.S. Cl.
 CPC ............... *B64D 25/14* (2013.01); *B64D 25/00* (2013.01); *B64D 2201/00* (2013.01)

(58) Field of Classification Search
 CPC ..................................................... B64C 1/1407
 USPC .......................................... 244/129.1, 129.5
 See application file for complete search history.

(56) References Cited

U.S. PATENT DOCUMENTS

| | | | | |
|---|---|---|---|---|
| 4,470,566 A | * | 9/1984 | Fitzgerald | ................... 244/129.5 |
| 4,966,388 A | * | 10/1990 | Warner et al. | .............. 280/730.1 |
| 5,106,036 A | | 4/1992 | Sepstrup | |
| 5,482,230 A | | 1/1996 | Bird et al. | |
| 5,647,609 A | * | 7/1997 | Spencer et al. | ............ 280/730.2 |
| 5,738,303 A | * | 4/1998 | Hamatani et al. | .......... 244/129.1 |
| 6,059,311 A | * | 5/2000 | Wipasuramonton et al. | . 280/729 |
| 6,371,514 B1 | * | 4/2002 | Bombard | ................... 280/730.2 |

(Continued)

FOREIGN PATENT DOCUMENTS

WO  2014024046 A2  2/2014

OTHER PUBLICATIONS

Aviation Safety: Evolution of Airplane Interiors Website Boeing, 6 pages, Accessed Sep. 13, 2012 http://www.boeing.com/commercial/aeromagazine/articles/2011_q4/2/.

(Continued)

*Primary Examiner* — Brian M O'Hara
*Assistant Examiner* — Keith L Dixon
(74) *Attorney, Agent, or Firm* — Kilpatrick Townsend & Stockton LLP; Dean W. Russell; Kristin M. Crall

(57) ABSTRACT

Described are airbag modules for a passenger door having a door bustle, an airbag positioned adjacent the door bustle, and an inflator positioned adjacent the door bustle. As examples, a pneumatic system is coupled to the inflator and the airbag, wherein the pneumatic system includes a slide lock that is configured to couple a girt bar of an escape slide to a passenger door sill when the inflator is activated. As additional examples, a valve is coupled to an inlet of the airbag, wherein the valve is configured to prevent the pressurized gas from flowing from the inflator to the airbag when the valve is closed and is configured to allow the pressurized gas to flow from the inflator to the airbag when the valve is open.

20 Claims, 8 Drawing Sheets

(56) References Cited

U.S. PATENT DOCUMENTS

| | | | |
|---|---|---|---|
| 7,287,727 B2* | 10/2007 | Myers et al. | 244/137.2 |
| 8,534,702 B2* | 9/2013 | Suzuki | 280/730.2 |
| 2010/0019474 A1 | 1/2010 | Kaneda et al. | |
| 2010/0276540 A1* | 11/2010 | Rojo | 244/121 |
| 2011/0139934 A1 | 6/2011 | Giesa et al. | |
| 2012/0256399 A1* | 10/2012 | Kokeguchi | 280/729 |

OTHER PUBLICATIONS

Barth, "Air Bag Systems in Aircraft," *International Conference on Cabin Safety Research,* Nov. 1, 1995, pp. 229-238.
European Patent Application No. 12186144.7, Extended European Search Report, mailed on Nov. 17, 2014, 6 pages.

* cited by examiner

AIRBAG MODULE ON PASSENGER DOOR

CROSS REFERENCE TO RELATED APPLICATION

This application is related to and claims priority benefits from U.S. Provisional Application Ser. No. 61/538,988, filed on Sep. 26, 2011, entitled DOOR BUSTLE AIRBAG (the "'988 application"). The '988 application is hereby incorporated herein in its entirety by this reference.

FIELD OF THE INVENTION

The invention relates to airbags for passenger doors or the like.

BACKGROUND

In various modes of transportation, passenger seats may be placed behind a structure. During a minor crash landing, a passenger may be thrown forward so that the passenger's head and/or body strikes these structures due to inertial loads from the event. Typically, these structures are rigid in nature, so as not to provide any energy absorbing or deflecting features. As a result, passengers may experience head injuries due to impact with these conventional structural designs.

As a particular example, passenger seats may be positioned adjacent a passenger door where an escape slide is mounted to an interior surface of the passenger door. The escape slide is typically enclosed with a door bustle, wherein the door bustle is usually formed of a material that is rigid in nature. Because the door bustle extends into the interior of the cabin in the space forward of a passenger seat positioned adjacent the passenger door when the passenger door is closed, a passenger seated in that seat may impact the door bustle in the event of a crash and may experience head injuries or other injuries as a result.

Thus, it may be desirable to provide structures with airbag modules within a potential strike zone on a door bustle to provide a surface with energy absorbing features so as to reduce the severity of potential head injuries that passengers may experience during a minor crash.

SUMMARY

Embodiments of the present invention include an airbag module for a passenger door having a door bustle comprising an inner surface and an outer surface comprising a breakable area, an airbag positioned adjacent the inner surface of the door bustle and the breakable area, wherein the breakable area is configured to allow the airbag to deploy through the outer surface, and an inflator coupled to the airbag and positioned adjacent the inner surface of the door bustle. An escape slide may also be positioned adjacent the inner surface of the door bustle and the airbag.

The breakable area may be pivotally coupled to a portion of the outer surface of the door bustle, and a stop may be positioned adjacent the breakable area and configured to prevent the breakable area from rotating forward past the stop. A film may be positioned to cover at least the breakable area.

In certain embodiments, the airbag module may comprise the door bustle, the airbag positioned adjacent the door bustle, the inflator positioned adjacent the door bustle, wherein the inflator is configured to release a pressurized gas when activated, and a pneumatic system coupled to the inflator and the airbag, wherein the pneumatic system comprises a slide lock that is configured to couple a girt bar of the escape slide to a passenger door sill when the inflator is activated. A valve may also be coupled to an inlet of the airbag, wherein the valve is configured to prevent the pressurized gas from flowing from the inflator to the airbag when the valve is closed and is configured to allow the pressurized gas to flow from the inflator to the airbag when the valve is open.

A method of controlling the airbag module and the pneumatic system may comprise detecting a signal from a sensing circuit, determining that a crash has occurred, transmitting a signal instructing the inflator to release pressurized gas, and transmitting a signal instructing the valve to open. The method may also comprise the steps of deploying the airbag through the door bustle and pivoting the breakable area away from an outer surface of the door bustle.

In other embodiments, the method of controlling the airbag module and the pneumatic system may comprise detecting a signal from the sensing circuit, determining that a crash has not occurred, detecting a signal from a door positioning sensor, determining that the passenger door is being opened from within an interior of a vehicle, transmitting a signal instructing the inflator to release the pressurized gas, and transmitting a signal instructing the valve to close.

The method of controlling the airbag module and the pneumatic system may also include a switch that activates a control system connected to the inflator and the valve, and the step of extending the slide lock to couple the girt bar of the escape slide to the passenger door sill.

DETAILED DESCRIPTION

Figure 2:
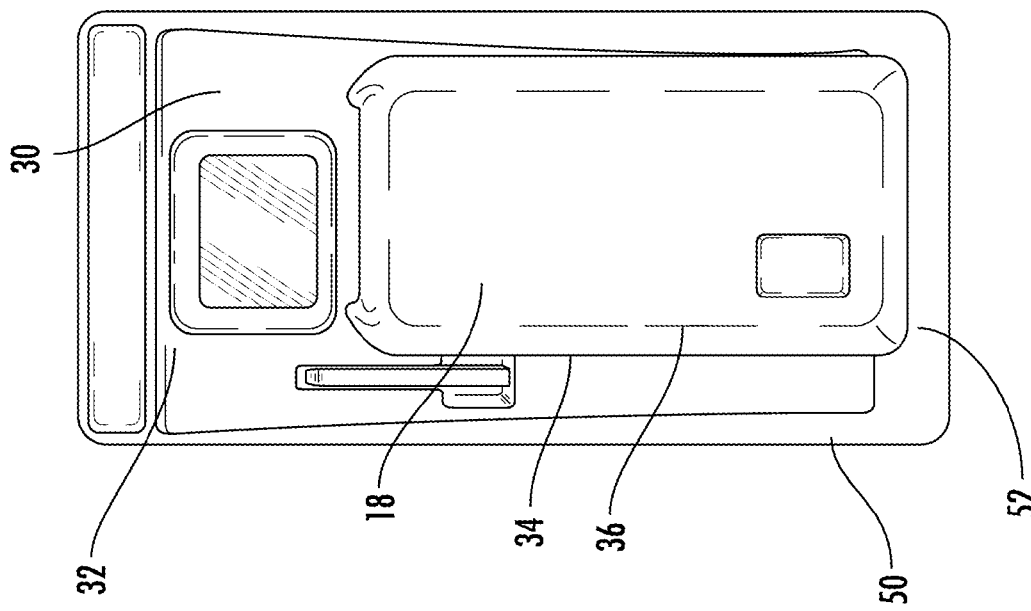
FIG. 2 is a perspective view of a door bustle coupled to the passenger door of FIG. 1.

The described embodiments of the invention provide airbag modules for passenger doors. While the airbag modules are discussed for use with aircraft seats, they are by no means so limited. Rather, embodiments of the airbag modules may be used in passenger doors or other doors of any type or otherwise as desired.

FIGS. 1-9 illustrate embodiments of an airbag module 10. In these embodiments, the airbag module 10 comprises at least one airbag 12, an inflator 14, at least one sensing circuit 16, and a door bustle 18.

The airbag 12 may be formed of a thin, nylon fabric or other suitable flexible materials. In some embodiments, the airbag 12 may include a rectilinear, oval, circular, or other overall deployed shape as needed for the location where the airbag module 10 is mounted. The airbag 12 may further comprise vent locations to assist with airbag deflation.

Figure 1:
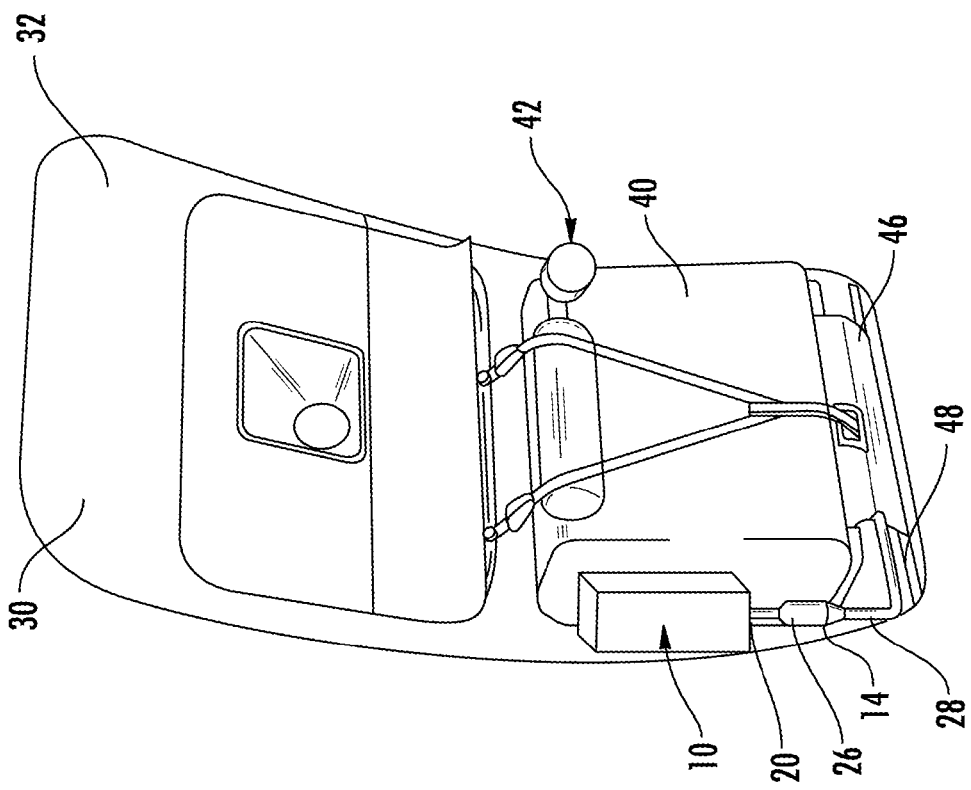
FIG. 1 is a perspective view showing a passenger door with an airbag module and an escape slide according to certain embodiments of the present invention.
Figure 3:
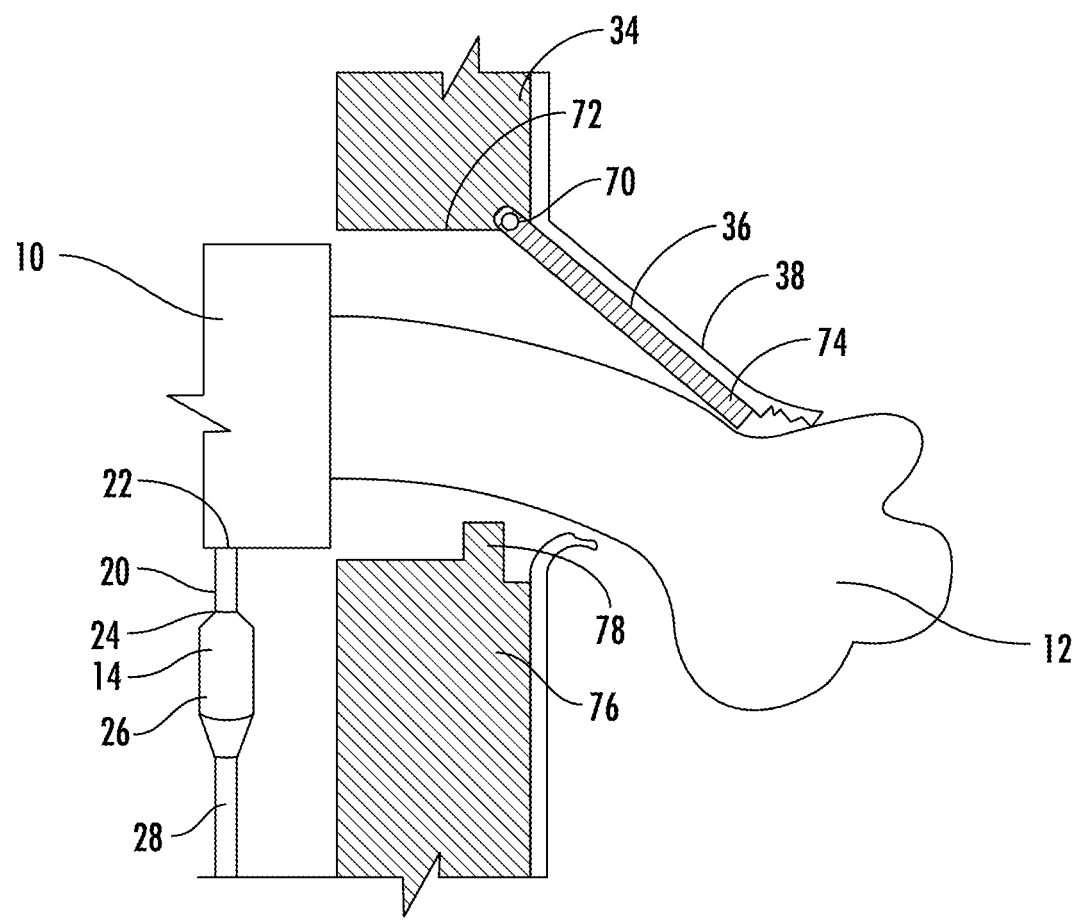
FIG. 3 is a partial cross-sectional view of the door bustle of FIG. 2 with the airbag module in a deployed state passing through a breakable area in an outer surface of the door bustle.

As illustrated in FIGS. 1 and 3, a gas hose 20 may be coupled to an inlet 22 in the airbag 12 and to an outlet 24 of the inflator 14. In some embodiments, the gas hose 20 may be integrally formed with the airbag 12 and/or the inflator 14. In other embodiments, the gas hose 20 may be coupled to the airbag 12 and/or the inflator 14 via any suitable mechanical or chemical fasteners including but not limited to adhesives, adhesion welding, or other suitable fastening methods. In yet other embodiments, the inflator 14 may be coupled directly to the airbag 12 without the need for the gas hose 20.

The inflator 14 may further comprise a canister 26. The canister 26 may be a high pressure gas vessel or other suitable container designed to withstand application of pressure up to 600 bar. The canister 26 may further comprise helium gas or any inert gas to rapidly inflate the airbag 12. However, one of ordinary skill in the relevant art will understand that any suitable chemical composition may be included within the canister 26 that produces a gas that rapidly inflates the airbag 12 within the required time period. A firing module 28 may be coupled to the inflator 14. The firing module 28 may include a pyrotechnic squib that will break a membrane in order to release the pressurized gas.

In certain embodiments, the sensing circuit 16 may comprise integrated logic to monitor for crash scenarios and to transmit a signal to the inflator 14 when such a scenario is detected. When the inflator 14 receives the signal from the sensing circuit 16, the inflator 14 deploys the airbag 12. The sensing circuit 16 may include a battery for reserve power and inflator firing charge capability. The sensing circuit 16 may be electrically connected to the firing module 28 of the inflator 14. For example, the sensing circuit 16 may be an electronics module assembly ("EMA") or other suitable electronics control module.

Figure 4:
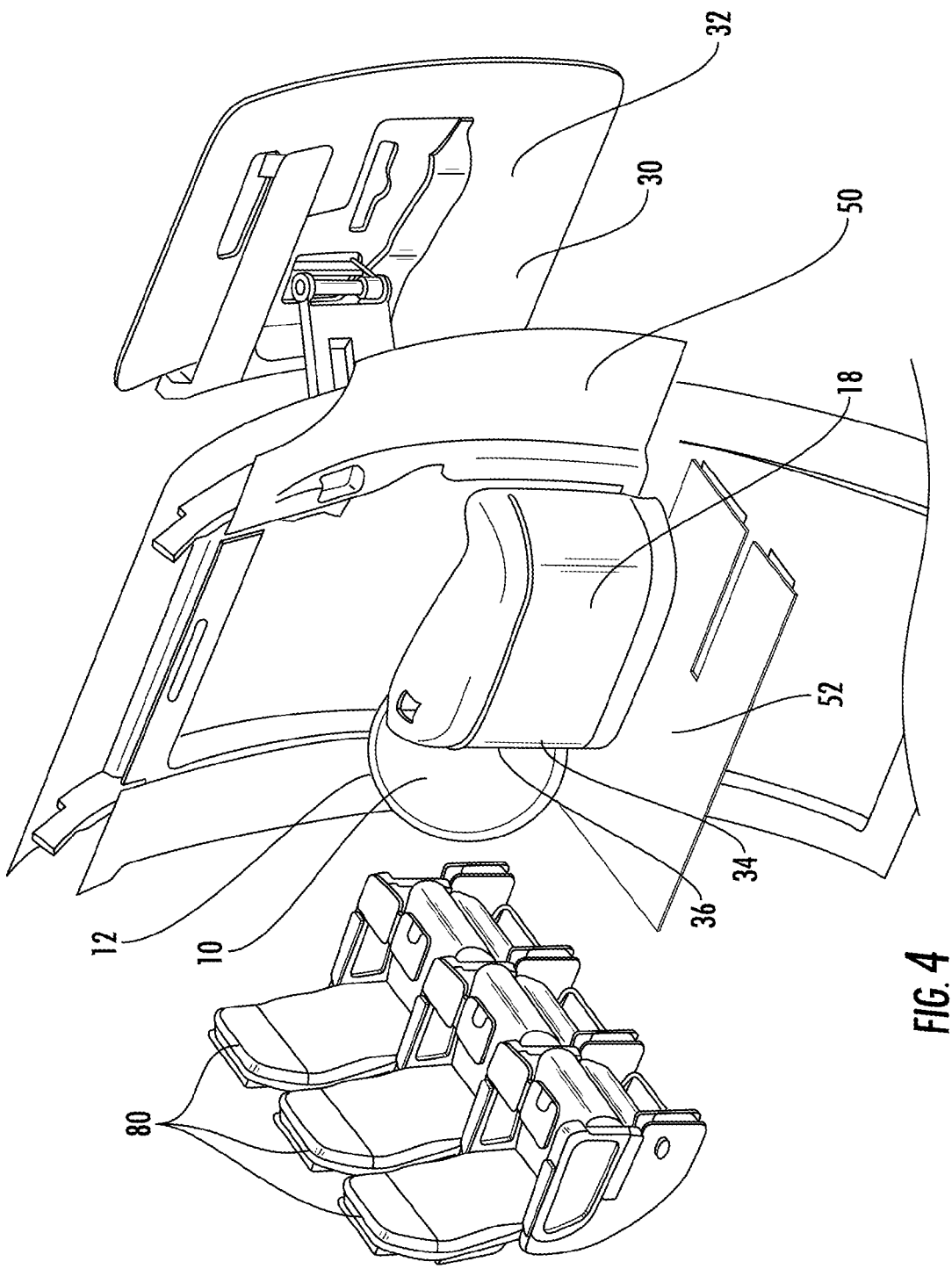
FIG. 4 is an exploded view of the passenger door and the door bustle of FIG. 2 with the airbag module in a deployed state forward of a passenger seat.
Figure 5:
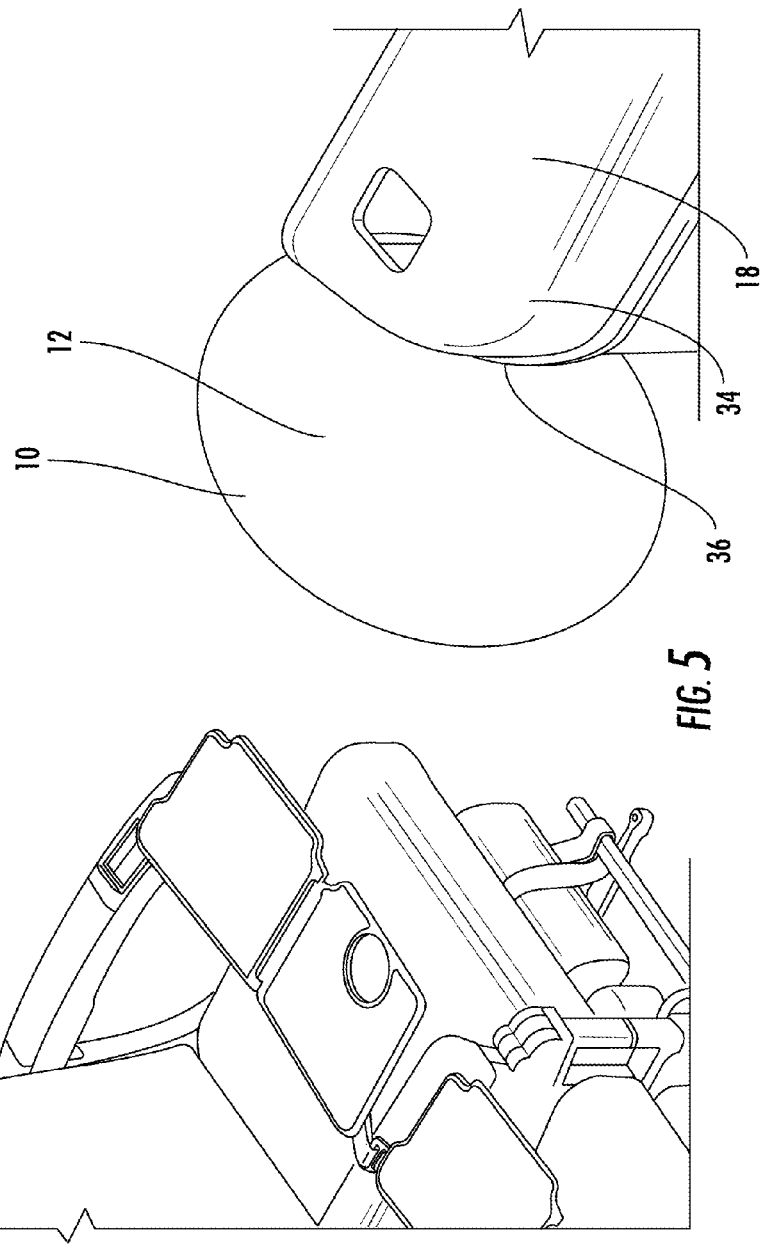
FIG. 5 is a perspective view of the door bustle of FIG. 2 with the airbag module in a deployed state forward of a passenger seat.

According to certain embodiments, as illustrated in FIGS. 1 and 2, the airbag module 10 may be positioned adjacent an inner surface of and/or attached to the door bustle 18, wherein the door bustle 18 may be positioned on an interior surface 30 of a passenger door 32 of an aircraft or other vehicle. As best shown in FIGS. 4 and 5, the airbag module 10 may be positioned forward of a passenger seat 80 positioned aft of the door bustle 18, wherein the airbag 12 may be shaped and sized to protect a passenger during a crash by guiding the passenger's extremities and/or limiting the imparted from the passenger into the door bustle 18. Suitable locations for the airbag 12 within or on the door bustle 18 may include potential head or body strike areas. The airbag 12 may be configured to form a crash surface for a passenger's entire body, head, knees, or any suitable combination thereof.

In certain embodiments, in order for the airbag 12 to freely escape the door bustle 18, as shown in FIG. 3, an outer surface 34 of the door bustle 18 may comprise a breakable area 36 to allow the airbag 12 to deploy through the outer surface 34. The breakable area 36 may be formed by partially cutting or otherwise weakening the outer surface 34 locally in a shape that that allows the airbag 12 to correctly deploy. The breakable area 36 may retain sufficient strength to withstand ordinary wear and tear usage, while also being configured to break quickly when the airbag 12 is deployed. For example, the breakable area 36 may be formed of composite materials, glass fibers, fabric, Kevlar with resin, or other suitable materials.

The breakable area 36 may be configured to be weaker on one side and stronger on an opposing side, wherein a first end 70 of the breakable area 36 may be pivotally coupled to an upper portion 72 of the outer surface 34. In certain embodiments, the first end 70 of the breakable area 36 may be adhered, bonded, sewn, mechanically coupled, or otherwise joined to the upper portion 72. A second end 74 of the breakable area 36 may be positioned adjacent a lower portion 76 of the outer surface 34. A stop 78 may be positioned adjacent the lower portion 76 so as to prevent the second end 74 of the breakable area 36 from rotating forward past the stop 78 under typical cabin usage conditions.

Conversely, the second end 74 of the breakable area 36 may be pivotally coupled to the lower portion 76 of the outer surface 34. In certain embodiments, the second end 74 of the breakable area 36 may be adhered, bonded, sewn, mechanically coupled, or otherwise joined to the lower portion 76. The first end 70 of the breakable area 36 may be positioned adjacent the upper portion 72 of the outer surface 34. The stop 78 may be positioned adjacent the upper portion 72 so as to prevent the first end 70 of the breakable area 36 from rotating forward past the stop 78 under typical cabin usage conditions.

In certain embodiments, the first end 70 and/or the second end 74 of the breakable area 36 may be adhered, bonded, sewn, mechanically coupled, or otherwise joined to the upper portion 72, the lower portion 76, or any other suitable location on the outer surface 34. In other embodiments, both the first end 70 and the second end 74 (and/or one or both sides) of the breakable area 36 may be pivotally or otherwise coupled to the upper portion 72 and/or the lower portion 76 (and/or sides) of the outer surface 34, and the breakable area 36 may include a weakened area centrally located within the breakable area 36. However, one of ordinary skill in the relevant art will understand that the breakable area 36 may have any suitable design and/or position that allows the airbag 12 to deploy without interference.

In certain embodiments, as further illustrated in FIG. 3, the entire outer surface 34 and/or the area substantially covering the breakable area 36 and/or a portion of the outer surface 34 surrounding the breakable area 36 may be covered by a film 38, such as polymers, polyethylene, polypropylene, polyester, nylon, vinyl, bioplastics, gels, silicone, wax, latex, resins, enamels, or other suitable coatings that may obscure the visibility or alter the appearance of the breakable area 36 for aesthetic purposes without mechanically interfering with the operation of the breakable area 36 when the airbag 12 is deployed.

Figure 6:
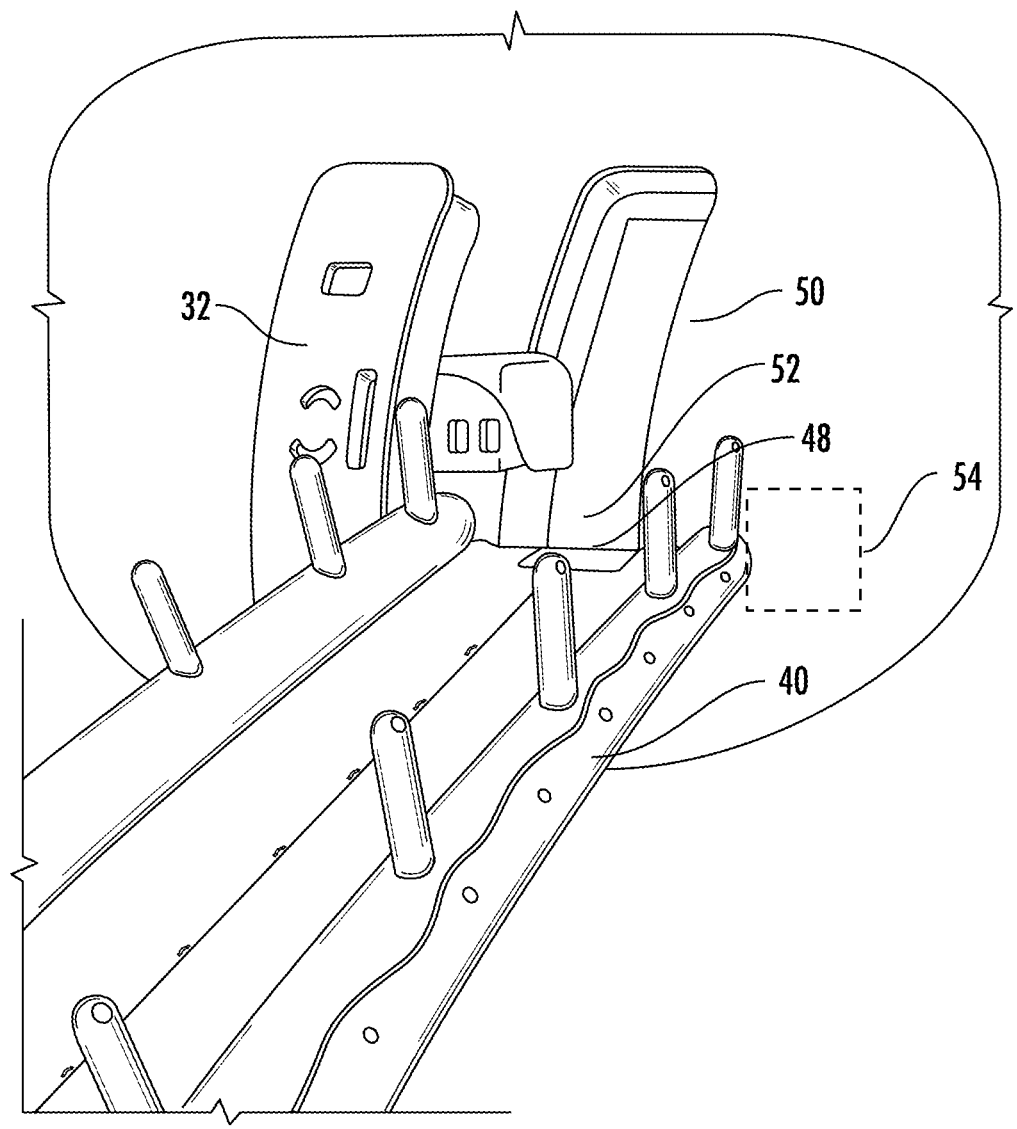
FIG. 6 is a perspective view of an escape slide deployed outside the passenger door of FIG. 1.

As shown in FIGS. 1 and 6, an escape slide 40 may be positioned adjacent an inner surface of and/or attached to the door bustle 18 for use during emergency evacuations of aircraft or other vehicles through the passenger door 32. An inflation cylinder 42 may be coupled to the escape slide 40. The inflation cylinder 42 may further comprise helium gas or any inert gas to rapidly inflate the escape slide 40. However, one of ordinary skill in the relevant art will understand that any suitable chemical composition may be included within the inflation cylinder 42 that produces a gas that rapidly inflates the escape slide 40 within the required time period.

A girt 46 may be coupled to an end of the escape slide 40 and may be configured to extend outside the door bustle 18. The girt 46 may also be coupled to a girt bar 48, which may be formed of metal or other suitable material with sufficient strength to couple the escape slide 40 to a fuselage 50 of the aircraft or other suitable structure of a vehicle.

During normal operation of the passenger door (i.e., boarding and de-boarding of passengers or other normal entry/exit of the aircraft or other vehicle), as illustrated in FIG. 2, the girt bar 48 is physically attached to the passenger door 32 so that the escape slide 40 remains stowed within the door bustle 18 when the passenger door 32 is opened.

At other times, such as when a rapid evacuation of the aircraft or vehicle is required, as illustrated in FIGS. 4 and 6, the girt bar 48 may be coupled to brackets located within or adjacent a passenger door sill 52. Thus, when the passenger door 32 is opened, the escape slide 40 is pulled out of the door bustle 18 because the girt bar 48 is physically attached to the fuselage 50 of the aircraft or other suitable structure of a vehicle. Once the escape slide 40 is substantially free of the door bustle 18 and the passenger door 32, the escape slide 40 will fall. The falling action of the escape slide 40 will release a pin or otherwise actuate the inflation cylinder 42, so that the escape slide 40 will inflate.

Figure 7:
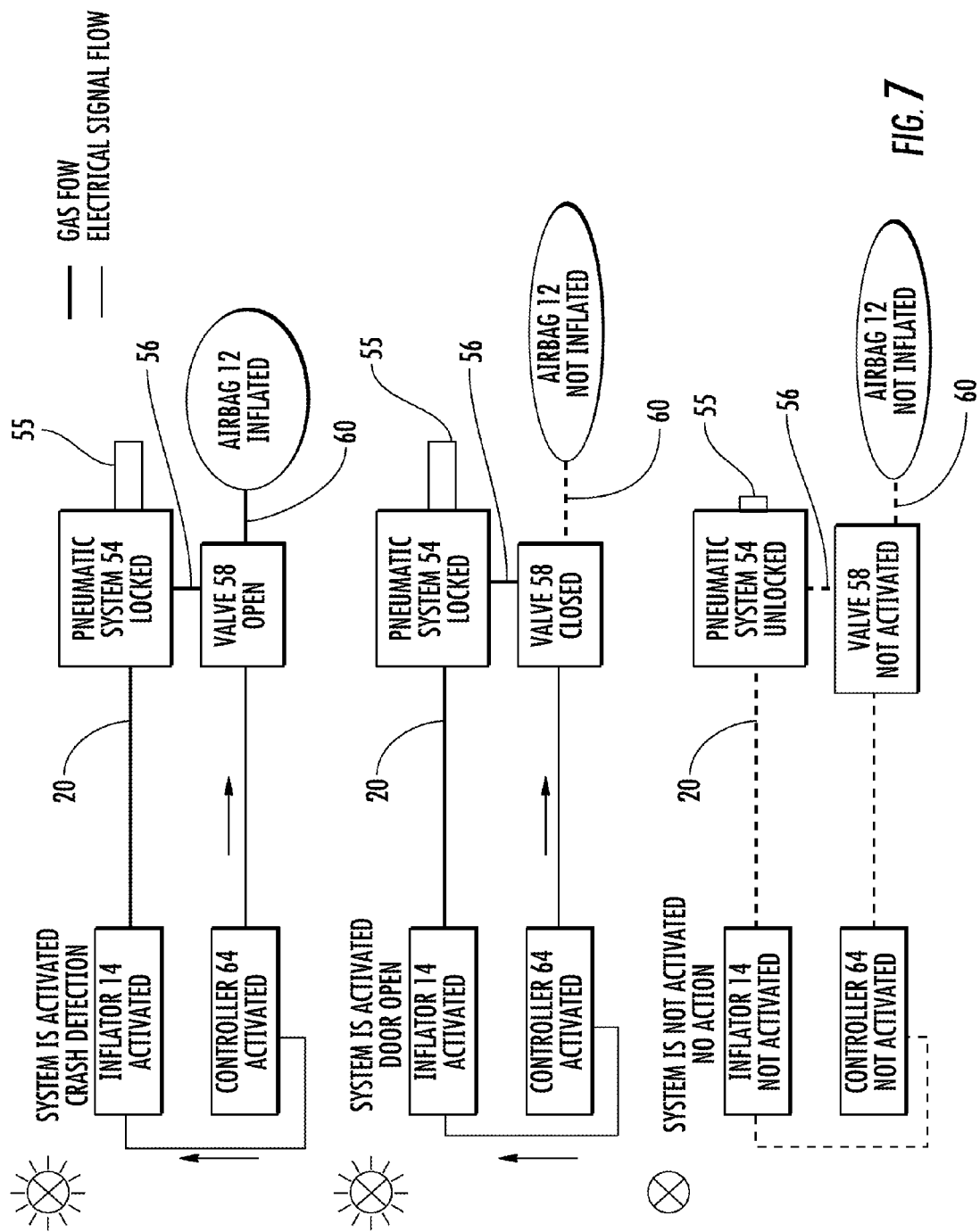
FIG. 7 is a diagram illustrating the operation of a control system for an airbag module and a pneumatic system under various conditions according to certain embodiments of the present invention.

In certain embodiments, as shown in FIGS. 6 and 7, the gas hose 20 or the outlet 24 of the inflator 14 may be coupled to an inlet of a pneumatic system 54. The pneumatic system 54 comprises a slide lock 55 or other mechanism that couples the girt bar 48 to the fuselage 50 of the aircraft or other suitable structure of a vehicle when actuated. In certain embodiments, the slide lock 55 may comprise a metal guide that is configured to slide over the girt bar 48 to lock the girt bar 48 to the fuselage 50. An outlet 56 of the pneumatic system 54 may be coupled to an inlet of a valve 58, wherein an outlet of the valve 58 may be coupled to another hose 60 or otherwise coupled to the inlet 22 of the airbag 12. In other embodiments, the gas hose 20 or the outlet 24 of the inflator 14 may split into two hoses that feed into two valves 58, with two output hoses coupled to the inlets of the pneumatic system 54 and the airbag 12, respectively.

Figure 8:
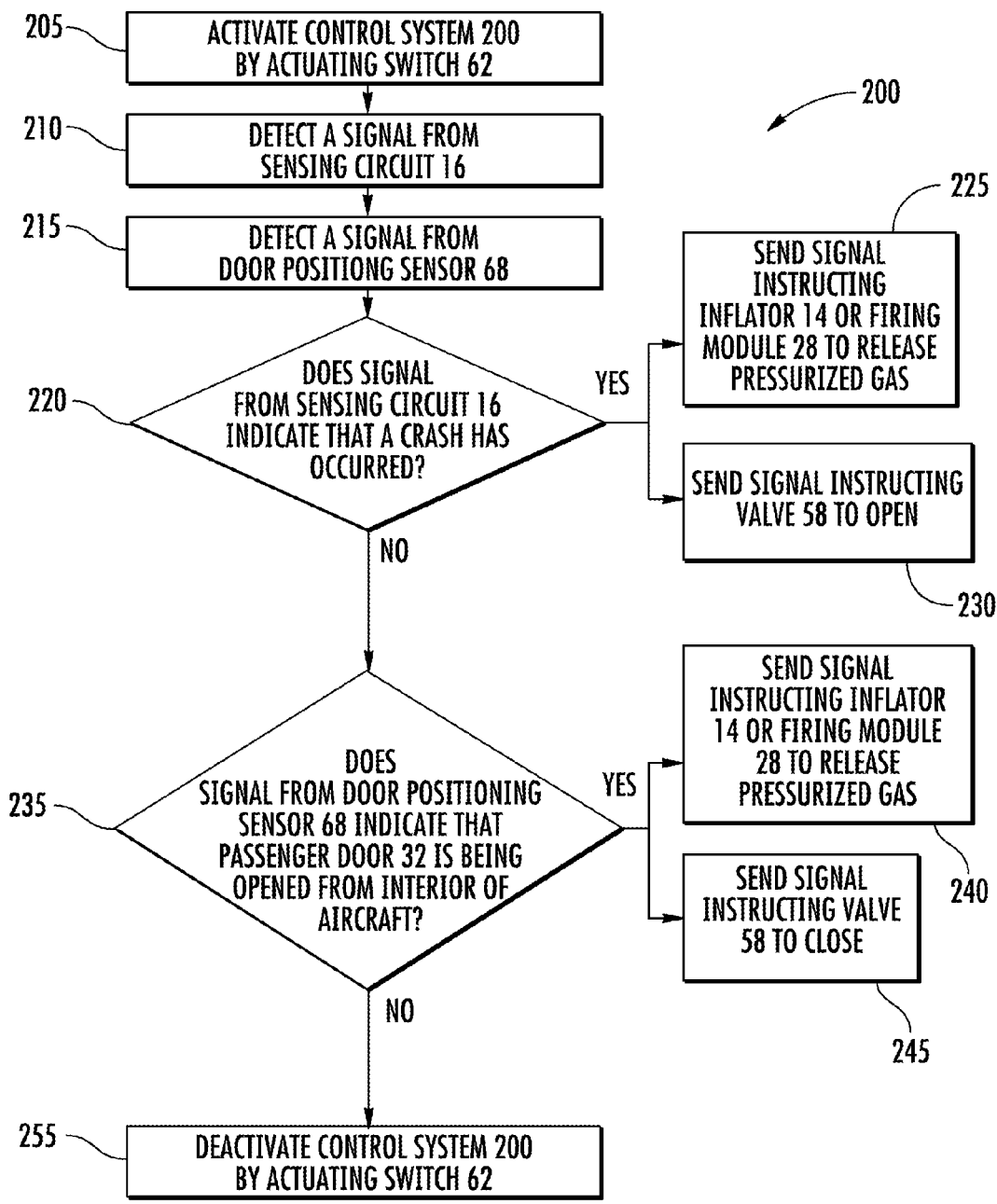
FIG. 8 is a simplified flow diagram illustrating a control system for an airbag module and a pneumatic system according to certain embodiments of the present invention.

According to these embodiments, the airbag 12 and the escape slide 40 operation may be controlled via a control system 200, which is illustrated in a simplified flow diagram shown in FIG. 8. The control system 200 may include processing logic that may comprise hardware (circuitry, dedicated logic, etc.), software (such as is run on a general purpose computing system or a dedicated machine), firmware (embedded software), or any combination thereof.

In the embodiments that utilize the control system 200 to operate the airbag 12 and escape slide 40, at step 205, the pilot activates the control system 200 by actuating a switch 62.

At step 210, a controller 64 (such as a smart relay or PLC) receives a signal from the sensing circuit 16. At step 215, the controller 64 receives a signal from a door positioning sensor 68.

At step 220, the controller 64 decides whether the signal from the sensing circuit 16 indicates that a crash has occurred. If so, at step 225, the controller 64 outputs a signal to the inflator 14 or firing module 28, in which the signal instructs to inflator 14 or firing module 28 to release the pressurized gas. Simultaneously, as step 230, the controller 64 outputs a signal to the valve 58, in which the signal instructs the valve 58 to open, allowing the gas to pass from the pneumatic system 54 to the airbag 12. As a result, the slide lock 55 is extended from the pneumatic system 54, thus locking the girt bar 48 to the fuselage 50, and the airbag 12 is deployed when the sensing circuit 16 indicates that a crash has occurred.

If, at step 220, the controller 64 decides that a crash has not occurred, at step 235, the controller 64 decides whether the signal from the door positioning sensor 68 indicates that the passenger door 32 is being opened from the interior of the aircraft or vehicle. If so, at step 240, the controller 64 outputs a signal to the inflator 14 or firing module 28, in which the signal instructs to inflator 14 or firing module 28 to release the pressurized gas. Simultaneously, at step 245, the controller 64 outputs a signal to the valve 58, in which the signal instructs the valve 58 to close, preventing the gas from passing from the pneumatic system 54 to the airbag 12. As a result, the slide lock 55 is extended from the pneumatic system 54, thus locking the girt bar 48 to the fuselage 50, when the passenger door 32 is opened from the interior of the aircraft or vehicle, but the airbag 12 is not deployed because the controller 64 determined that a crash has not occurred.

At step 250, the controller 64 may output a signal to the inflation cylinder 42 or the fall of the escape slide 40 may actuate the inflation cylinder 42 to release the pressurized gas so that the escape slide 40 may inflate.

At step 255, the pilot deactivates the control system 200 by actuating the switch 62 so that the controller 64 does not receive a signal from the sensing circuit 16 or the door positioning sensor 68. Thus, when the control system 200 is deactivated, the slide lock 55 is retracted within the pneumatic system 54, thus unlocking the girt bar 48 to the fuselage 50, when the passenger door 32 is opened from the interior of the aircraft or vehicle and the escape slide 40 does not deploy.

Figure 9:
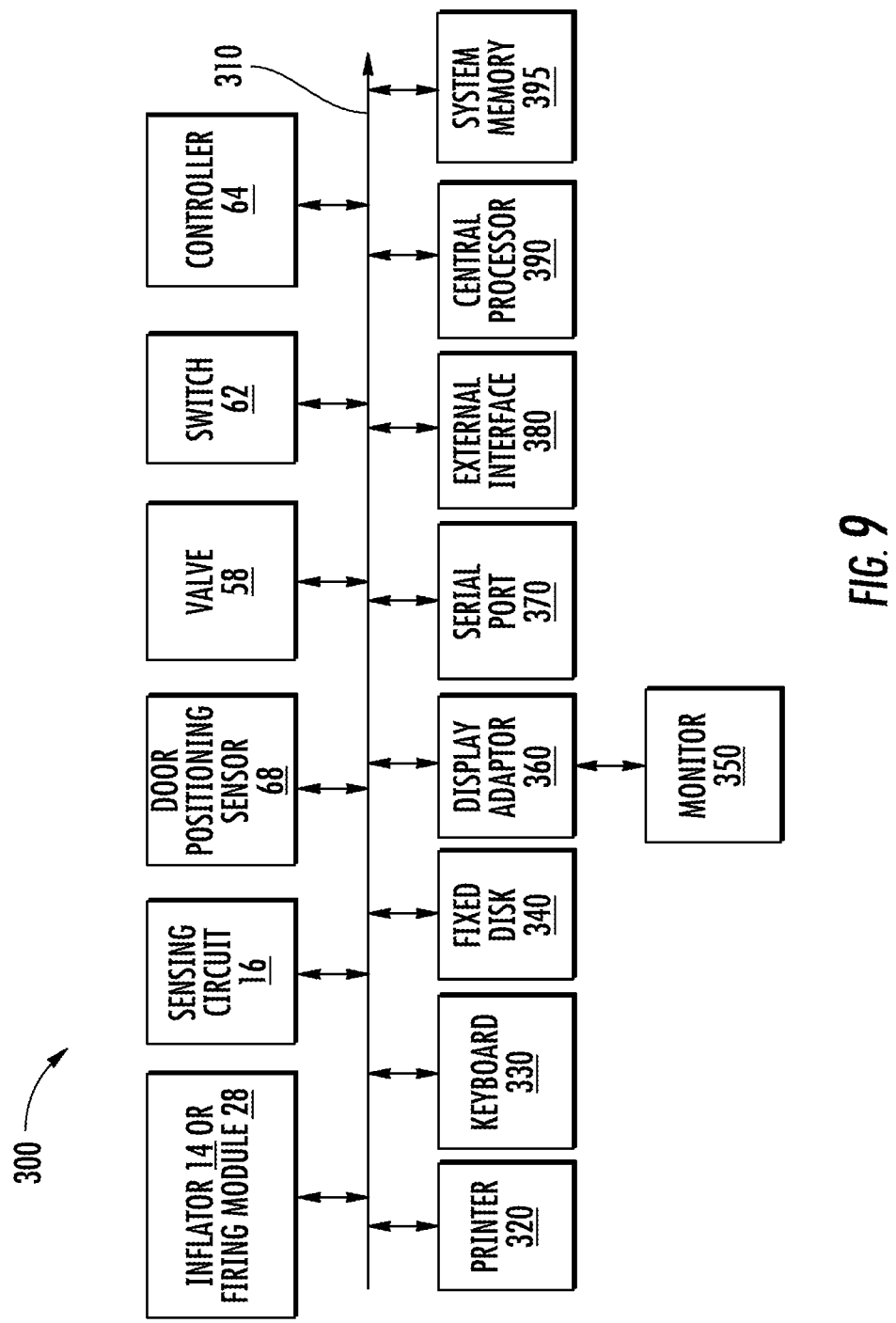
FIG. 9 is diagram of a control system apparatus for an airbag module and a pneumatic system according to certain embodiments of the present invention.

FIG. 9 is a diagram of a control system apparatus 300 according to certain embodiments of the present invention. The various participants and elements in the control system 200 may use any suitable number of subsystems in the control system apparatus 300 to facilitate the functions described herein. Examples of such subsystems or components are shown in FIG. 9. The subsystems or components shown in FIG. 9 may be interconnected via a system bus 310 or other suitable connection. In addition to the subsystems described above, additional subsystems such as a printer 320, keyboard 330, fixed disk 340 (or other memory comprising computer-readable media), monitor 350, which is coupled to a display adaptor 360, and others are shown. Peripherals and input/output (I/O) devices (not shown), which couple to the controller 64, can be connected to the control system 200 by any number of means known in the art, such as a serial port 370. For example, the serial port 370 or an external interface 380 may be used to connect the control system apparatus 300 to a wide area network such as the Internet, a mouse input device, or a scanner. The interconnection via the system bus 310 allows a central processor 390 to communicate with each subsystem and to control the execution of instructions from a system memory 395 or the fixed disk 340, as well as the exchange of information between subsystems. The system memory 395 and/or the fixed disk 340 may embody a computer-readable medium.

The software components or functions described in this application may be implemented via programming logic controllers ("PLCs"), which may use any suitable PLC programming language. In other embodiments, the software components or functions described in this application may be implemented as software code to be executed by one or more processors using any suitable computer language such as, for example, Java, C++ or Perl using, for example, conventional or object-oriented techniques. The software code may be stored as a series of instructions or commands on a computer-readable medium, such as a random access memory ("RAM"), a read-only memory ("ROM"), a magnetic medium such as a hard-drive or a floppy disk, or an optical medium such as a CD-ROM. Any such computer-readable medium may also reside on or within a single computational apparatus, and may be present on or within different computational apparatuses within a system or network.

The invention can be implemented in the form of control logic in software or hardware or a combination of both. The control logic may be stored in an information storage medium as a plurality of instructions adapted to direct an information processing device to perform a set of steps disclosed in embodiments of the invention. Based on the disclosure and teachings provided herein, a person of ordinary skill in the art will appreciate other ways and/or methods to implement the invention.

In embodiments, any of the entities described herein may be embodied by a computer that performs any or all of the functions and steps disclosed.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. An airbag module for a passenger door of an aircraft, comprising:
    (a) a door bustle configured to store an aircraft escape slide, the door bustle comprising an inner surface and an outer surface comprising a breakable area;
    (b) an airbag positioned adjacent the inner surface of the door bustle and the breakable area, wherein the breakable area is configured to allow the airbag to deploy through the outer surface; and
    (c) an inflator coupled to the airbag and positioned adjacent the inner surface of the door bustle.

2. The airbag module of claim 1, wherein the breakable area is pivotally coupled to a portion of the outer surface of the door bustle.

3. The airbag module of claim 1, further comprising a stop positioned adjacent the breakable area and configured to prevent the breakable area from rotating forward past the stop.

4. The airbag module of claim 1, wherein the door bustle further comprises a film that is positioned to cover at least the breakable area.

5. The airbag module of claim 1, wherein the escape slide is positioned adjacent the inner surface of the door bustle and the airbag.

6. An airbag module for a passenger door comprising:
    (a) a door bustle;
    (b) an airbag positioned adjacent the door bustle;
    (c) an inflator positioned adjacent the door bustle, wherein the inflator is configured to release a pressurized gas when activated; and
    (d) a pneumatic system coupled to the inflator and the airbag, wherein the pneumatic system comprises a slide lock that is configured to couple a girt bar of an escape slide to a passenger door sill when the inflator is activated.

7. The airbag module of claim 6, further comprising a valve that is coupled to an inlet of the airbag, wherein the valve is configured to prevent the pressurized gas from flowing from the inflator to the airbag when the valve is closed and is configured to allow the pressurized gas to flow from the inflator to the airbag when the valve is open.

8. The airbag module of claim 6, wherein the escape slide is positioned adjacent the door bustle and coupled to the girt bar.

9. The airbag module of claim 6, wherein the door bustle comprises an outer surface comprising a breakable area and the airbag is positioned adjacent the breakable area, wherein the breakable area is configured to allow the airbag to deploy through the outer surface.

10. The airbag module of claim 9, wherein the breakable area is pivotally coupled to a portion of the outer surface of the door bustle.

11. The airbag module of claim 9, further comprising a stop positioned adjacent the breakable area and configured to prevent the breakable area from rotating forward past the stop.

12. The airbag module of claim 9, wherein the door bustle further comprises a film that is positioned to cover at least the breakable area.

13. A method of controlling an airbag module comprising (i) an airbag and (ii) an inflator, and a pneumatic system comprising a slide lock, wherein an outlet of the inflator is coupled to an inlet of the pneumatic system, an outlet of the pneumatic system is coupled to an inlet of a valve, and an outlet of the valve is coupled to an inlet of the airbag, the steps comprising:
    detecting a signal from a sensing circuit;
    determining that a crash has occurred;
    transmitting a signal instructing the inflator to release pressurized gas; and
    transmitting a signal instructing the valve to open.

14. The method of claim 13, further comprising a switch that activates a control system connected to the inflator and the valve.

15. The method of claim 13, further comprising the step of extending the slide lock to couple a girt bar of an escape slide to a passenger door sill.

16. The method of claim 15, further comprising the step of deploying the airbag through a door bustle.

17. The method of claim 16, further comprising the step of pivoting a breakable area away from an outer surface of the door bustle.

18. A method of controlling an airbag module comprising (i) an airbag and (ii) an inflator, and a pneumatic system comprising a slide lock, wherein an outlet of the inflator is coupled to an inlet of the pneumatic system, an outlet of the pneumatic system is coupled to an inlet of a valve, and an outlet of the valve is coupled to an inlet of the airbag, the steps comprising:
    detecting a signal from a sensing circuit;
    determining that a crash has not occurred;
    detecting a signal from a door positioning sensor;
    determining that a passenger door is being opened from within an interior of a vehicle;
    transmitting a signal instructing the inflator to release pressurized gas; and
    transmitting a signal instructing the valve to close.

19. The method of claim 18, further comprising a switch that activates a control system connected to the inflator and the valve.

20. The method of claim 19, further comprising the step of extending the slide lock to couple a girt bar of an escape slide to a passenger door sill.

* * * * *